United States Patent [19]

Ramstetter

[11] 3,745,839
[45] July 17, 1973

[54] APPARATUS FOR CONTROLLING THE MOVEMENT OF A PROGRAM CARRIER
[75] Inventor: Rudolf Ramstetter, Starnberg, Germany
[73] Assignee: Firma Otto Ramstetter Kommanditgesellschaft, Munich, Germany
[22] Filed: May 11, 1971
[21] Appl. No.: 142,184

[30] Foreign Application Priority Data
July 11, 1970 Germany............... P 20 34 516.8

[52] U.S. Cl.................. 74/30, 340/149 A, 178/7.6
[51] Int. Cl............................................. F16h 19/04
[58] Field of Search................... 74/29, 89.17, 422, 74/100, 99, 30, 31; 340/149 A; 90/13.99

[56] References Cited
UNITED STATES PATENTS
1,512,647   10/1924   Stevens.................................. 74/29
2,155,497   4/1939    Latil....................................... 74/30
2,796,729   6/1957    Black..................................... 74/30
3,069,608   12/1962   Forrester et al. ................... 90/13.99
3,217,852   11/1965   Brown et al. ......................... 74/422
3,337,806   8/1967    Oppenheimer et al. ............... 74/30
3,602,643   8/1971    Wright, Jr. ...................... 340/149 A
3,627,994   12/1971   Sellbach............................ 340/149 A Primary Examiner—Charles J. Myhre
Assistant Examiner—Wesley S. Ratliff, Jr.
Attorney—W. G. Fasse

[57] ABSTRACT

The present program carrier control apparatus comprises a power storing and releasing device such as a spiral spring, which is arranged to be cocked in response to driving the program carrier in a forward direction past a sensing station. When the program carrier reaches a predetermined forward position, the energy stored in the storing device is instantaneously released for rapidly returning the program carrier into a starting position.

17 Claims, 3 Drawing Figures

PATENTED JUL 17 1973

INVENTOR.
RUDOLF RAMSTETTER
BY
W. G. Casse
ATTORNEY

APPARATUS FOR CONTROLLING THE MOVEMENT OF A PROGRAM CARRIER

BACKGROUND OF THE INVENTION

The present invention relates to an apparatus for controlling the movement of a program carrier, especially to such an apparatus in which a sensing device is arranged adjacent to the path of the back and forth movement of the program carrier for scanning the program carrier as it is driven by suitable drive means past the sensing device.

Control arrangements of this type are used, for example, for controlling machine tools in accordance with a program. However, the present device is suitable for use in connection with any program control in which a program carrier is moved back and forth past a sensing station.

The program carrier may be a program card which usually comprises punched holes operating as gear teeth or which card is provided with a toothed rack. In any event, either the punched holes or the toothed rack are adapted for cooperation with a pinion driven by a drive member. Frequently, it is desirable to either return the program control card to its starting position after a program sequence has been completed or to repeat a portion of the program. In this connection it is known, to reverse the direction of rotation of the motor for the drive pinion, whereby the card is returned to the starting position in accordance with the rotational speed of the drive motor.

This return of the program carrier by reversing the direction of rotation of the drive motor thus requires a respective amount of time which is lost for the actual program sequence so that the program itself is unnecessarily prolonged.

OBJECTS OF THE INVENTION

In view of the foregoing it is the aim of the invention to achieve the following object singly or in combination:

to overcome the drawbacks of the prior art, especially to keep the time to a minimum which is required for returning the program carrier;

to return the program carrier rapidly by a distance or spacing which is to be repeated for the further program sequence or which is to be repeated for a new program whereby such rapid return is to be accomplished by a power which has been stored during the forward movement of the program carrier and which is instantaneously effective upon the program carrier for returning it to a desired return position;

to store a certain amount of energy in response to the forward movement of the program carrier, whereby such stored energy is kept within such limits as will not impede the forward movement of the program carrier;

to assure that the program carrier will be moved in a reverse direction by an exactly predetermined distance;

to assure a more efficient utilization of the controlled apparatus, for example a machine tool, and to reduce the amount of time necessary for a program sequence or for resetting the controlled apparatus for the repetition of a program;

to assure that energy which has been stored in response to the forward advance of the program carrier is suddenly released so that the program carrier will be returned to the desired position during a minimum amount of time; and to assure an exact control of the termination of the forward and reverse movement of the program carrier.

SUMMARY OF THE INVENTION

According to the invention there is provided an apparatus for controlling the movement of a program carrier which, through drive means, is moved back and forth past a sensing or scanning device. The apparatus comprises an energy storing device in which the stored energy is increased in response to the forward movement of the program carrier. The drive means which move the program carrier past the sensing or scanning device are disconnected from the program carrier when the latter reaches an adjustable or predeterminable forward position. The stored energy is released at the earliest simultaneously with disconnecting the drive means from the program carrier for rapidly returning the latter by a predetermined length or distance. The apparatus further comprises means for limiting the return movement of the program carrier.

The driving connection between the program carrier and a source for supplying forward drive power may comprise gear means as part of the program carrier which cooperate with a positively driven pinion. If desired, such pinion may be connected to the source of forward drive power through reduction gear means. In one embodiment of the invention, a second drive pinion is provided which also cooperates with the gear means of the program carrier and simultaneously with the energy storing means.

It has been found to be advantageous to apply the stored energy to the program carrier to cause its return movement without impeding the effect of the stored energy. This is accomplished according to the invention by uncoupling or decoupling the forward driving connection of the program carrier from the forward drive source. For example, this may be accomplished by shifting the drive pinion out of meshing contact with the gear means of the program carrier. Substantially the same effect, namely avoiding any impedance of the return movement of the program carrier, may be achieved by disrupting the connection between the drive pinion and the gearing of the drive source.

BRIEF DESCRIPTION OF THE DRAWINGS

In order that the invention may be clearly understood, it will now be described, by way of example, with reference to the accompanying drawings, wherein.

DETAILED DESCRIPTION OF EXAMPLE EMBODIMENTS

Figure 1:
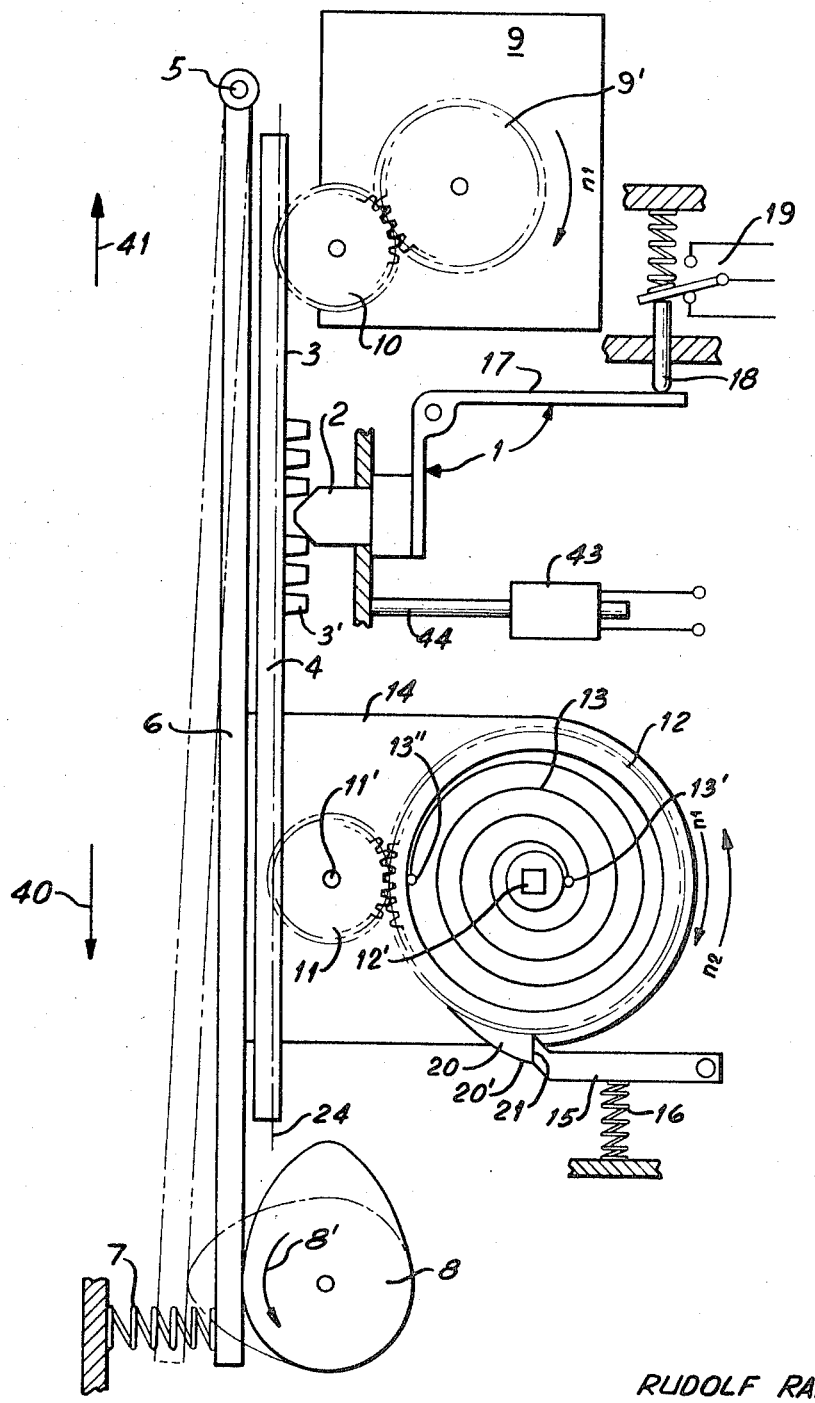
FIG. 1 is a schematic side view of a first embodiment of a control apparatus according to the invention comprising a forward drive pinion and a separate return pinion.

Referring to FIG. 1 there is shown a diagrammatic view of a first embodiment of a control apparatus according to the invention comprising a sensing device 1 including a sensing or scanning pin 2 which scans the embossed surface 3 of the program carrier 4 which may be, for example, a program card. The protruding surface members 3' of the program carrier 4 represent the program as such, as is well known in the art. The protruding surface members 3' may be replaced by punched holes in the program carrier as is also known in the art.

The program carrier 4 is supported by a support member 6 one end of which is journaled to a housing or chassis not shown, by means of a journal axis 5. The tilting of the support member 6 from its full line position into its dash dotted position or vice versa is accomplished by the cooperation between a spring 7 and a cam member 8, the operation of which will be described in more detail below.

Figure 2:
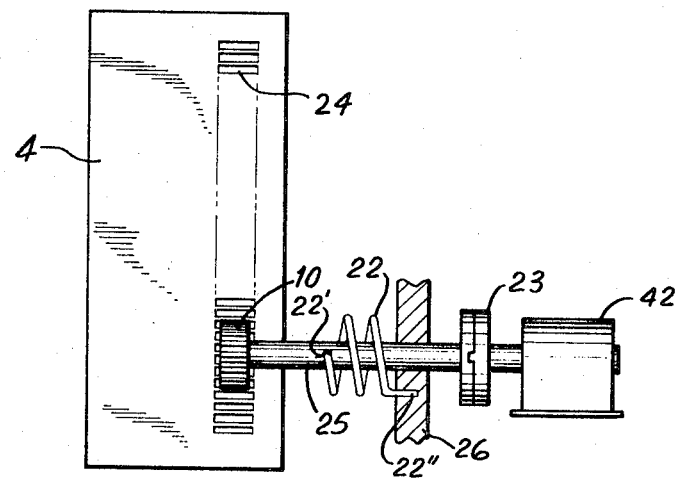
FIG. 2 is a top view illustrating another embodiment of a control apparatus according to the invention employing but one pinion for the forward and reverse movement of the program carrier.
Figure 3:
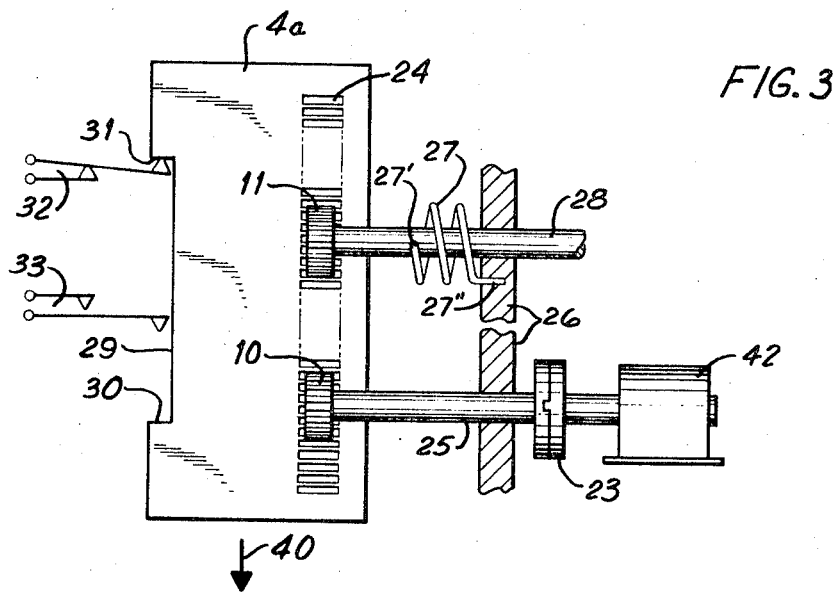
FIG. 3 is a view similar to that of FIG. 2 but illustrating two separate drive pinions as well as contact means for the position control of the program carrier.

The program carrier 4 is driven in a forward direction by means of a drive member 9, for example a motor, which drives a pinion 10, for example through a gear member 9'. The forward direction is indicated by the arrow 40. In order that the forward drive pinion 10 may actively drive the program carrier 4, the latter is provided with gear means 24 as shown in FIGS. 2 and 3. The gear means 24 may, for example, comprise perforations in the program carrier itself or a toothed rack may be attached to the program carrier.

The gear means 24 of the program carrier 4 further cooperate or mesh with a second pinion 11 which is journaled on a shaft 11' attached to a plate or wall 14 which in turn is attached to the support member 6. The pinion 11 meshes with a gear 12 also rotatably attached to the plate 14 by means of a shaft 12', whereby the gear 12 is also supported through the plate 14 by the support member 6. A power or energy storing means, for example a spiral spring 13 is connected with its inner end 13' to the shaft 12'. The spiral spring 13 has an outer end 13'' which is secured to the plate 14. Thus, the pinion 11, the gear 12, and the spiral spring 13 are all connected to the support member 6 by means of the plate 14.

As viewed in FIG. 1, the gear 12 is provided with a cam disk 20 either secured to the gear 12 or forming part thereof, whereby the cam disk 20 is located behind the gear 12 or rather between the gear 12 and the plate 14. The cam disk 20 cooperates with a pawl 15 which is biased by a spring 16. When the cam disk 20 rotates along with the gear 12 in the forward direction indicated by the arrow n1, the tip of the pawl 15 rides in a groove of the cam disk 20 until it rides up on the cam surface 20' but without snapping against a stop surface 21 of the cam disk 20 as will be described in more detail below.

The apparatus according to FIG. 1 operates as follows. When the motor or drive member 9 drives the gear 9' in the direction n1, the forward drive pinion 10 is in meshing contact with the gear 24 of the program carrier 4, thus moving the program carrier 4 in the forward direction indicated by the arrow 40, whereby the program carrier 4 is moved past the scanning pin 2 of the sensing device 1. The sensing pin 2 is perpendicularly supported relative to the program carrier 4 so that it may follow the program representing protrusions and depressions 3' on the surface 3 of the program carrier 4 as the latter passes the sensing pin in contact therewith.

As the pin 2 scans the surface of the program carrier 4 it performs back and forth movements corresponding to said depressions and protrusions. These back and forth movements are transmitted, for example, by a lever mechanism 17 to a switching rod 18 which actuates switching means 19 in response to the movement of the sensing pin 2.

As long as the program carrier 4 moves in the forward direction 40, the support member 6 is in its full line position. Accordingly, the gear means 24 of the program carrier 4 mesh not only with the pinion 10 but also with the pinion 11 driving it in counter clockwise direction. The pinion 11 drives the gear 12 which thus cocks the spiral spring 13 in response to the forward movement of the program carrier as it passes the scanning device 1.

In the embodiment of FIG. 1, the size of the pinion 11 and of the gear 12 is selected so that the entire length of the forward advance of the program carrier 4 is slightly less than one complete revolution of the gear 12. Thus, the tip of the pawl 15 will not override the entire length of the cam surface 20' since the gear 12 and the cam disk 20 form a unit, the latter rotates also in the direction of the arrow n1, that is in clockwise direction, whereby the tip of the spring biased pawl 15 glides along the cam surface of the cam disk 20 as the latter is driven together with the gear 12. Just prior to the completion of a complete revolution by the gear 12 and the cam disk 20, the support member 6 together with the program carrier 4, the pinion 11, the gear 12 with the spring 13, and the cam disk 20 are moved into the dash dotted position of the support member 6 as shown in FIG. 1. This is accomplished by rotating the cam member 8 in the direction of the arrow 8'. At this time, that is, just shortly prior to the completion of a complete revolution of gear 12, the tip of the pawl 15 rides up on the raised end portion 20' of the cam member 20 however, not far enough so as to snap against the stop surface 21. The cam member 8 performs about a one quarter revolution in response to the program carrier reaching its forward end position. The cam meber 8 may be operated in a plurality of ways, for example, it may be pivoted by the pawl 15 when the latter rises on said end portion 20'. The cam member 8 then maintains this position independently of the position of the pawl 15 during the movement of the gear 12 counterclockwise (n2). The starting position of the cam member 8 out of which the support member 6 was lowered may be restored by a further control impulse caused, for instance, when the pawl 15 comes to rest against the stop surface 21. However, cam member 8 may also be operated in response to the movement of the program carrier 4 as will be described below.

Simultaneously with the downward tilting of the support member 6, the program carrier 4 is brought out of meshing contact with the forward drive pinion 10 whereby it is decoupled from the drive motor 9. Further, the scanning pin 2 is disengaged from the embossed surface 3' of the program carrier. However, the downward movement of the support member 6 does not disengage the pinion 11 from the program carrier. Thus, the driving force of the motor 9 cannot be effective on the program carrier 4 whereas the force of the cocked spring 13 can be instantaneously transmitted through the pinion 11 to the program carrier 4. Thus, the uncocking spring 13 moves the gear 12 and with it the cam disk 20 in the counter clockwise direction as indicated by the arrow n2. The gear 12 rotates the pinion 11 and thus the program carrier 4 slides along the support member 6 back into its starting position as shown by arrow 41 in a very short period of time.

The return movement of the program carrier 4 is limited and thus the starting position of the program carrier 4, as shown in FIG. 1, is defined by the stop surface 21 on the cam disk 20. When the tip of the pawl 15 rests against the stop surface 21, as is illustrated in FIG. 1, the program carrier 4 is in its starting position. During the return movement of the program carrier 4 in the direction of the arrow 41, the cam member 8 is moved in clockwise direction for approximately one quarter of a full revolution whereby the support member 6 along with the program carrier 4 and all the elements carried by the support member 6 are returned to the starting position by spring 7 at the end of the return movement. As a result, the program carrier 4 is again brought into meshing contact with the drive pinion 10 and it is thus coupled to the drive means 9, 9' whereupon a new feed advance of the program carrier 4 starts and the program sequence is repeated.

The cam disk 20 in the embodiment of FIG. 1, serves as a stop for limiting the return movement of the program carrier whereby the forward and return movements have a length corresponding substantially to the length of the program carrier, such as a card.

A modification of the embodiment of FIG. 1 involves limiting the length of the return movement to a fraction of the length of the forward movement whereby the gear 12 makes several revolutions during the forward movement but only a few or one revolution, or even just a fraction of one revolution during the return movement in accordance with the arrangement of the cam disk 20 and the pawl 15 relative to each other. If the program carrier is to be returned completely, the pawl 15 is to be retracted out of the reach of stop surface 21 of the cam disk 20. In this instance, the end position of the program carrier may, for example, be defined by a stop effective upon the program carrier itself.

The embodiment illustrated in FIG. 2 employs only one drive pinion 10 for the forward and reverse movement of the program carrier 4. Here again, the pinion 10 is in meshing contact with the gear means 24 of the program carrier 4. The pinion 10 is driven in the forward direction by a motor 42 connected to the pinion 10 through a clutch 23 and a shaft 25. The power or energy storing means used in FIG. 2 comprise a helical spring 22. One end 22' of the spring 22 is rigidly connected to the shaft 25 between the clutch 23 and the pinion 10, preferably adjacent to the pinion 10. The other end 22" of the spring 22 is secured to a wall 26 of the chassis or housing.

The clutch 23 is thus arranged between the point of the shaft to which the end 22' is connected and the drive motor 42. When the pinion 10 is driven in the forward direction, the spring 22 is cocked just as in the embodiment of FIG. 1. Upon the completion of the forward advance of the program carrier 4, the drive shaft 25 of the pinion 10 is disengaged from the motor 42 by means of the clutch 23 whereby the energy stored in the cocked spring 22 is instantaneously transmitted to the pinion 10 through the shaft 25 for returning the program carrier 4 to its starting position.

The actuation or disengagement of the clutch 23 in response to the reaching of the forward end position by the program carrier 4, may be accomplished by the actuation of respective contacts directly through the program carrier itself as will be described with reference to FIG. 3. Further with reference to FIG. 2 it will be appreciated that the helical spring 22 could be replaced, for example, by a spiral spring. In any event, the spring could also be arranged on the left side of the pinion 10, whereby the end 22' could be secured to the pinion itself while the spring end 22" would also be secured to a fixed member of the apparatus, such as a chassis wall. Moreover, the spring could be replaced by other spring means directly effective upon the program carrier 4, for example leaf spring means.

The embodiment of FIG. 3 employs, similarly to the embodiment of FIG. 1, two pinions 10 and 11. The drive motor 42 is again coupled to the pinion 10 through a clutch 23 and a drive shaft 25 just as in FIG. 2. However, the power or energy storing means in the form of a helical spring 27, shown in FIG. 3, is effective upon the drive pinion 11 through the shaft 28 separate from shaft 25. For this purpose, one end 27' of the spring 27 is rigidly secured to the shaft 28 while the other end 27" of the spring 27 is rigidly secured to the chassis 26. Since both the pinion 10 and the pinion 11 are in meshing contact with the gear means 24 of the program carrier 4a, the spring 27 will be cocked as the program carrier 4a is driven in the forward direction 40 through the pinion 10. As soon as the clutch 23 is released or uncoupled, the energy stored in the spring 27 is instantaneously released for rotating the pinion 11 and thus rapidly returning the program carrier 4 to its starting position.

The springs 22 and 27 may be connected with their respective ends 22' and 27' to the respective shaft 25 or 28 by means of clutches or other coupling means not shown.

As shown in FIG. 3, the program carrier 4a is provided with a longitudinal notch or recess 29 along an edge of the program carrier 4a. The end walls of the notch 29 provide stop means 30 and 31 which cooperate with respective contact elements 32 and 33 for controlling forward and reverse limits of the program carrier movement. In FIG. 3 the arrow 40 again indicates the forward direction of movement and as shown, the program carrier 4a has just reached its forward most position in which the contact means 32 are closed by the upper limit stop 31. The closure of the contact means 32 may, for example, operate a relay which in turn deactivates the clutch 23, whereby the details of the clutch activating circuit are not shown since they are well known in the art.

As the rapid return motion of the program carrier 4a starts instantly upon the release of the clutch 23, the stop 30 comes into cooperating engagement with the contact set 33 which is thereby closed. Such closure is used for reengaging the driving connection between the motor 42 and the drive pinion 10, whereby the program carrier is ready for a new forward movement.

As mentioned above, the power or energy storing means may comprise, for example, spiral springs such as shown at 13 in FIG. 1 or helical springs as shown at 22 or 27 in FIGS. 2 or 3. So called torsional springs are also suitable for the purposes of the present invention. Preferably, the spring means are pre-stressed or biased, so that during the forward movement of the program carrier 4 or 4a, the spring means are additionally stressed or cocked, whereby the spring means exert a force on the program carrier in the direction of return movement while the program carrier is moving forwardly. Such force shall be limited in such a manner that it will not impede the forward movement of the program carrier.

In the embodiments in which only one drive pinion is used, the power or energy storing means will be driven directly by the pinion 10 or by the shaft 25 which drives the pinion 10 as shown in FIG. 2. In this particular embodiment, a coupling such as the clutch 23 is to be provided in the embodiment of FIG. 2 in order to disconnected the drive motor 42 from the drive pinion 10. However, the clutch 23 is not necessarily required in the embodiment of FIG. 3 if the program carrier 4a is tiltable as shown in FIG. 1 for disrupting the meshing contact between the pinion 10 and the gear means 24 of the program carrier.

As a modification of the forward and reverse stop limits illustrated in connection with FIG. 3 it is possible to provide the program carrier itself with respective forward and reverse markings, for example, the last and first protrusion of a program cycle may be employed for controlling the respective coupling means.

A still different embodiment for limiting the reverse motion may be provided in the form of cam means as illustrated in connection with FIG. 1. A still different modification for controlling or stopping the reverse movement could be in the form of a brake cooperating with the power or energy storing means.

It is also advantageous to disengage the program carrier 4 or 4a from the sensing device 1 during the return movement of the program carrier because in this manner the sensing elements, such as the scanning pin 2, cannot cause a reading as a result of the sudden return movement of the program carrier. In the embodiment of FIG. 1, the separation between the program carrier 4 and the sensing device 1 is basically accomplished by the tilting of the support member 6 into its dash dotted position during the return movement of the program carrier. However, in the alternative a separate lifting mechanism, such as a solenoid 43 may be provided which is linked to the sensing device with its armature 44. The solenoid may be energized in response to the return movement of the program carrier 4 whereby the entire sensing device is lifted and thus the scanning pin 2 is prevented from contacting the surface of the program carrier 4.

In the above described embodiments, the energy storing means as well as the decoupling devices and the driving connections between the drive means and the program carrier have been illustrated as mechanical means. However, it is quite possible to employ means operating on different principles but providing the same function, for example, the drive means for the program carrier could be electro magnetic solenoids. Thus, although specific example have been described, it is to be understood that the invention is intended to cover all modifications and equivalents within the scope of the appended claims.

What I claim is:

1. An apparatus for moving a program carrier in a forward direction and in a reverse direction comprising sensing means, drive means for moving the program carrier past said sensing means in said forward direction, said drive means including a drive member as well as program carrier advancing means, coupling means operatively interposed between said drive member and said carrier advancing means, program carrier returning means, and power storing means connected to said carrier returning means whereby said power storing means is cocked by said drive means when the latter advances said program carrier in said forward direction, and whereby said program carrier is returned by said power storing means in response to decoupling of said drive member from said carrier advancing means to return said program carrier for a predetermined distance with a speed appreciably higher than the speed of said program carrier in said forward direction.

2. The apparatus according to claim 1, further comprising means for limiting the reverse movement of the program carrier.

3. The apparatus according to claim 1, wherein said carrier advancing means comprise a first pinion driven by said drive member, and wherein said carrier returning means comprise a second pinion for cooperating with said power storing means, said program carrier comprising means for meshing with said first and second pinion.

4. The apparatus according to claim 3, wherein said drive means further comprise reduction gear means arranged between said drive member and said first pinion.

5. The apparatus according to claim 3, wherein said coupling means comprise clutch means for connecting said drive member to said first pinion and positioning means for disrupting the meshing between the first pinion and the program carrier, said apparatus further comprising decoupling means for cooperating with said clutch means and with said positioning means for simultaneously disengaging said drive member from said first pinion and disrupting the meshing between said first pinion and the program carrier.

6. The apparatus according to claim 3, wherein said coupling means comprise positioning means for disrupting the meshing between the first pinion and the program carrier, whereby decoupling of the drive member is accomplished.

7. The apparatus according to claim 3, wherein said coupling means comprise a support member for said program carrier, journal means journaled to one end of said support member, said coupling means comprising means for tilting the support member with the program carrier thereon toward and away from said first pinion as well as toward and away from said sensing means, said apparatus further comprising means for attaching said power storing means as well as said second pinion to said support member whereby tilting of the support member also decouples the second pinion as well as the power storing and releasing means from said forward drive means.

8. The apparatus according to claim 1, wherein said power storing means comprise spring means.

9. The apparatus according to claim 8, wherein said spring means are pre-stressed. 10.

10. The apparatus according to claim 1, wherein said carrier advancing means and said carrier returning means comprise a common pinion and a shaft for connecting said pinion to said drive member, said power storing means being connected to said shaft at a shaft point located between said drive member and said pinion, said coupling means being arranged between said drive member and said shaft point, said program carrier comprising means for meshing with said pinion.

11. The apparatus according to claim 1, wherein said program carrier comprises means for actuating said coupling means.

12. The apparatus according to claim 11, wherein said actuating means for said coupling means comprise stop means formed as notches in said program carrier and contact means arranged for actuation by said stop means whereby the forward and reverse movement of the program carrier is limited by said stop means.

13. The apparatus according to claim 1, further comprising stop elements arranged for cooperation with said power storing means to limit the reverse movement of the program carrier.

14. The apparatus according to claim 1, further comprising means for separating from each other said program carrier and said sensing means during the reverse movement of the program carrier.

15. The apparatus according to claim 1, wherein said carrier advancing means comprise a first pinion as well as a shaft for connecting said first pinion to said drive member, and wherein said program carrier returning means comprise a second pinion as well as means for journaling said second pinion, said power storing means comprising means for operatively connecting said second pinion to the power storing means, said coupling means being arranged between said drive member and said shaft, said program carrier comprising means for meshing with said first and second pinion.

16. The apparatus according to claim 1, wherein said carrier advancing means and said carrier returning means comprise a common pinion and a shaft for connecting the pinion to the drive member, said power storing means being arranged for cooperation with said pinion to cock the power storing means when said drive member drives the pinion in a forward direction and to drive the pinion by the power storing means in a reverse direction when the drive member is decoupled from said shaft by said coupling means, said program carrier comprising means for meshing with the pinion.

17. An apparatus for controlling the movement of a program carrier comprising: sensing means positioned relative to the program carrier for scanning the program carrier, forward drive means, coupling means for operatively connecting the forward drive means to the program carrier for moving the program carrier past the sensing means in a forward direction, power storing means, reverse drive means operatively connected between said power storing means and said program carrier for storing energy in said power storing means in response to the forward movement of the program carrier, means for decoupling said coupling means in response to a predetermined forward position of the program carrier for moving the program carrier in a reverse direction by the reverse drive means actuated by said power storing means to return the program carrier for a predetermined distance with a return speed appreciably higher as the forward speed caused by said forward drive means, and means for limiting the reverse movement of said program carrier.

* * * * *